(12) United States Patent
Reeves et al.

(10) Patent No.: US 8,020,767 B2
(45) Date of Patent: Sep. 20, 2011

(54) SYSTEMS AND METHODS FOR MONITORING A QUANTITY OF WASTE IN A WASTE TRANSFER STATION ENVIRONMENT

(75) Inventors: Theodore S. Reeves, Springfield, VT (US); Donald S. Buchanan, Manchester, NH (US)

(73) Assignee: Casella Waste Systems, Inc., Rutland, VT (US)

( * ) Notice: Subject to any disclaimer, the term of this patent is extended or adjusted under 35 U.S.C. 154(b) by 740 days.

(21) Appl. No.: 11/384,303

(22) Filed: Mar. 21, 2006

(65) Prior Publication Data

US 2007/0222600 A1    Sep. 27, 2007

(51) Int. Cl.
*G06F 19/00* (2011.01)
(52) U.S. Cl. ........................... 235/385; 235/384
(58) Field of Classification Search .............. 235/384, 235/385
See application file for complete search history.

(56) References Cited

U.S. PATENT DOCUMENTS

| | | | |
|---|---|---|---|
| 4,787,467 A * | 11/1988 | Johnson | 177/50 |
| 5,014,206 A * | 5/1991 | Scribner et al. | 701/207 |
| 5,340,968 A | 8/1994 | Watanabe et al. | |
| 5,565,846 A | 10/1996 | Geiszler et al. | |
| 5,712,789 A * | 1/1998 | Radican | 700/226 |
| 5,837,945 A | 11/1998 | Cornwell et al. | |
| 5,947,256 A | 9/1999 | Patterson | |
| 6,206,282 B1 | 3/2001 | Hayes, Sr. et al. | |
| 6,520,544 B1 | 2/2003 | Mitchell et al. | |
| 6,690,402 B1 | 2/2004 | Waller et al. | |
| 6,729,540 B2 * | 5/2004 | Ogawa | 235/384 |
| 6,759,959 B2 | 7/2004 | Wildman | |
| 2002/0072923 A1 * | 6/2002 | Guidry | 705/1 |
| 2002/0105424 A1 | 8/2002 | Alicot et al. | |
| 2002/0154915 A1 | 10/2002 | Bullock et al. | |
| 2002/0196150 A1 | 12/2002 | Wildman | |
| 2003/0001726 A1 | 1/2003 | Moore | |
| 2003/0067381 A1 | 4/2003 | Mitchell et al. | |
| 2004/0004119 A1 | 1/2004 | Baldassari et al. | |
| 2004/0046672 A1 | 3/2004 | Kasik et al. | |
| 2004/0129781 A1 | 7/2004 | Kreiner et al. | |
| 2004/0133484 A1 | 7/2004 | Kreiner et al. | |
| 2004/0153379 A1 | 8/2004 | Joyce et al. | |
| 2004/0178264 A1 | 9/2004 | Linton et al. | |
| 2004/0027243 A1 | 12/2004 | Carrender | |
| 2005/0080520 A1 * | 4/2005 | Kline et al. | 701/1 |

OTHER PUBLICATIONS

Anonymous, Wired?, Mar. 1, 1998, World Wastes; 41,3.*

* cited by examiner

*Primary Examiner* — Daniel A Hess
*Assistant Examiner* — Michael Andler
(74) *Attorney, Agent, or Firm* — Wilmer Cutler Pickering Hale and Dorr LLP (57) ABSTRACT

Systems and methods are provided for monitoring a quantity of waste in a waste transfer station environment. Embodiments of the invention maintain a running total of waste deposited within the waste transfer station by automating the process of recording the weights of vehicles depositing and removing waste from the waste transfer station.

26 Claims, 7 Drawing Sheets

Table 700

| | | | Scale in | | Scale out | | Transaction Net Weight | Total Net Weight In | Total Net Weight Out | Overall Net Weight |
|---|---|---|---|---|---|---|---|---|---|---|
| | | | Weight | Time Stamp/Data | Weight | Time Stamp/Data | | | | |
| Line 1 | Collection vehicle 118a | 7:15 | 8.3 | 07:15/Data | | | | | | |
| Line 2 | Collection vehicle 118b | 7:30 | 9.2 | 07:30/Data | | | | | | |
| Line 3 | Collection vehicle 118a | 7:45 | | | 5.6 | 07:45/Data | 2.7 | 2.7 | 0.0 | +2.7 |
| Line 4 | Transfer trailer 120a | 8:00 | 5.0 | 08:00/Data | | | | 2.7 | 0.0 | +2.7 |
| Line 5 | Collection vehicle 118c | 8:07 | 8.6 | 08:07/Data | | | | 2.7 | 0.0 | +2.7 |
| Line 6 | Collection vehicle 118b | 8:15 | | | 6.2 | 08:15/Data | 3.0 | 5.7 | 0.0 | +5.7 |
| Line 7 | Transfer trailer 120b | 8:30 | 5.0 | 08:30/Data | | | | 5.7 | 0.0 | +5.7 |
| Line 8 | Collection vehicle 118c | 8:37 | | | 5.1 | 08:37/Data | 3.5 | 9.2 | 0.0 | +9.2 |
| Line 9 | Collection vehicle 118d | 8:45 | 9.4 | 08:45/Data | | | | 9.2 | 0.0 | +9.2 |
| Line 10 | Collection vehicle 118e | 9:00 | 9.6 | 09:00/Data | | | | 9.2 | 0.0 | +9.2 |
| Line 11 | Transfer trailer 120c | 9:15 | 5.0 | 09:15/Data | | | | 9.2 | 0.0 | +9.2 |
| Line 12 | Collection vehicle 118d | 9:30 | | | 6 | 09:30/Data | 3.4 | 12.6 | 0.0 | +12.6 |
| Line 13 | Transfer trailer 120a | 9:45 | | | 16.4 | 12:30/Data | 11.4 | 12.6 | 11.4 | +1.2 |
| Line 14 | Collection vehicle 118e | 10:00 | | | 5.4 | 10:00/Data | 4.2 | 16.8 | 11.4 | +5.4 |
| Line 15 | | 10:15 | | | | | | 16.8 | 11.4 | +5.4 |
| Line 16 | Collection vehicle 118f | 10:30 | 8.3 | 10:30/Data | | | | 16.8 | 11.4 | +5.4 |
| Line 17 | Collection vehicle 118g | 10:45 | 9.1 | 10:45/Data | | | | 16.8 | 11.4 | +5.4 |
| Line 18 | Collection vehicle 118h | 11:00 | 8.8 | 11:00/Data | | | | 16.8 | 11.4 | +5.4 |
| Line 19 | Collection vehicle 118f | 11:15 | | | 5.1 | 11:15/Data | 3.2 | 20.0 | 11.4 | +8.6 |
| Line 20 | Collection vehicle 118g | 11:30 | 8.8 | 11:30/Data | | | | 20.0 | 11.4 | +8.6 |
| Line 21 | Collection vehicle 118g | 11:45 | | | 6.4 | 11:45/Data | 2.7 | 22.7 | 11.4 | +11.3 |
| Line 22 | Transfer trailer 120b | 12:00 | | | 5.3 | 12:00/Data | 3.5 | 26.2 | 11.4 | +14.8 |
| Line 23 | Collection vehicle 118i | 12:15 | | | 4.9 | 12:15/Data | 3.9 | 30.1 | 11.4 | +18.7 |
| Line 24 | | 12:30 | | | | | | | 11.4 | +18.7 |
| Line 25 | Collection vehicle 118j | 12:45 | 7.9 | 12:45/Data | | | | 30.1 | 11.4 | +18.7 |
| Line 26 | Transfer trailer 120b | 13:00 | | | 15.8 | 13:00/Data | 10.8 | 30.1 | 22.2 | +7.9 |
| Line 27 | Collection vehicle 118j | 13:15 | | | 4.2 | 13:15/Data | 3.7 | 33.8 | 22.2 | +11.6 |
| Line 28 | Transfer trailer 120c | 13:30 | | | 16.6 | 13:30/Data | 11.6 | 33.8 | 33.8 | 0.0 |
| Line 29 | | 13:45 | | | | | | | | |

FIG. 7

SYSTEMS AND METHODS FOR MONITORING A QUANTITY OF WASTE IN A WASTE TRANSFER STATION ENVIRONMENT

BACKGROUND OF THE INVENTION

1. Field of the Invention

Embodiments of the present invention relate to the field of solid waste and recyclables disposal. In particular, embodiments of the present invention relate to an automated tracking system that can be used to monitor a quantity of waste in a municipal solid waste transfer station environment.

2. Background Description

Waste management companies provide residential, commercial, and municipal waste management and recycling services for communities and organizations. Customers range from single residences to entire towns or companies. Municipalities may contract or otherwise engage a waste management service provider to handle their municipal solid waste (MSW). MSW is garbage, refuse, and other discarded materials that result from residential, commercial, industrial and/or community activities. MSW may also include mixed waste, such as unsorted waste from businesses or homes. MSW does not include, for example, hazardous waste, animal waste used as fertilizer, or sewage sludge.

Typically, a waste collector, which may be an entity employed by a local authority or a private firm to collect waste from residences, businesses and/or community bins, transports MSW to a transfer station, where the MSW is dumped and processed. A transfer station is an intermediate facility at which MSW is transferred from collection vehicles into larger trucks or rail cars, for transport to its final disposal destination—typically, a landfill. Mixed waste may be also sorted into constituent components at a transfer station to recover recyclable materials, such as wood, glass and/or metal.

To determine the weight of material deposited, the operation of a transfer station includes, for each collection vehicle, weighing the collection vehicle during a "scale-in" operation, the collection vehicle depositing its load at a designated dumping area, and weighing the collection vehicle again during a "scale-out" operation. During the scale-in and scale-out operations, the scale house operator manually enters into a computer information related to each transaction. Such information may include, for example, a vehicle identification (ID) number, a trailer ID number, a customer ID, a hauler ID, the generator of the waste (e.g., a business), the origin of the waste (e.g., a municipality), the waste type (e.g., MSW and/or recyclables), the quantity of special waste (e.g., number of tires, batteries, or propane tanks), and the calculated weight of the material to be dumped.

Once deposited at the designated dumping area, the waste is sorted into MSW and other recoverable materials, such as wood or metal. Subsequently, individual containers (transfer trailers) are loaded, for example, with MSW only, metal only, or wood only. Filled transfer trailers that contain MSW only are either transported to a landfill or temporarily placed in a staging area for later transport to a landfill. Likewise, any filled transfer trailers that contain only recoverable material, such as metal or wood, are either transported immediately to a recycling facility, or placed temporarily in a staging area for later transport to a recycling facility. Ideally, these containers would be completely full, but this is not necessary for proper operation of the system.

As each transfer trailer leaves the transfer station or is transported to the staging area within the MSW transfer station, a scale-out operation occurs to determine and track the waste unloaded by the transfer trailer. Again, this is a manual process of entering information into a computer. Manual tracking of waste within a MSW transfer station, for example, is performed by personnel using a computer keypad. Such manual operations are labor and time intensive, and thus inefficient and prone to error. We have discovered that there exists a need to automate the tracking of inbound waste, outbound waste, and internal movement of waste within a MSW transfer station.

State and local regulations govern the flow of material through each transfer station. As a result, each MSW transfer station has permit requirements that are based on state and local rules and/or regulations. One such regulation is a "clean floor" requirement, wherein the "floor" refers to a designated dumping area within the MSW transfer station. The clean floor requirement requires that the floor be free of all waste and recyclable materials at least once within a predetermined period of time, such as once every 24 or 48 hours. Consequently, there is a need to show that the volume of material dumped at the floor equals the volume of material removed from the floor within the given time period.

Clean floor log activities are manually entered into a computer. Thus, a clean floor log may not always be up to date or accurate. Consequently, due to delays that may be associated with manually entering data, the clean floor log may not always provide an indication that a clean floor event has occurred within the predetermined time cycle. Furthermore, the clean floor log must be provided, upon request, to a regulatory authority at any time. If the operator of a MSW transfer station is unable to satisfy the clean floor requirement of a regulatory authority, the operator is at risk of being fined or losing its operating permit. We have discovered that there exists a need to automate the monitoring of clean floor status in a way that facilitates the accurate reporting of the MSW clean floor status.

Another regulation that is based on state and local regulations pertains to the total elapsed time that an individual transfer trailer can remain within the MSW transfer station facility, from the time it begins to be filled with material. For example, once a transfer trailer begins to be filled, it must be transported from the MSW transfer station facility to it final destination within, for example, 24 or 48 hours. The tracking of each transfer trailer is also kept manually on a computer and is thus not always up to date and is subject, for example, to transcription errors. We have discovered that there is a need to automated the manner in which transfer trailers can be monitored. We have also discovered that there exists a need to automated reporting of the status of each transfer trailer and each trailer's movement.

SUMMARY OF EMBODIMENTS OF THE INVENTION

In one embodiment of the present invention, a system includes a reader for reading a first plurality of identifiers. Each of the first plurality of identifiers stores a vehicle identifier associated with a respective plurality of waste collection vehicles. A second plurality of identifiers is used to store a waste receptacle identifier associated with a respective plurality of waste receptacles.

A general purpose computer that uses a data repository is also provided. The data repository stores the read vehicle identifier associated with respective waste collection vehicles, and the read waste receptacle identifier associated with respective waste receptacles. In addition, the data repository stores a first plurality of values representing a weight difference, between a respective plurality of substantially full and substantially empty waste collection vehicles, at respective times.

The data repository further stores a second plurality of values representing a weight difference, between a respective plurality of substantially full and substantially empty waste receptacles, at respective times. The computer maintains a running total by utilizing the respective times, in a time sequenced manner, to add each of the first plurality of values and subtract each of the second plurality of values from the first plurality of values.

Before explaining embodiments of the invention in detail, it is to be understood that embodiments of the invention are not limited in their application to the details of construction and to the arrangements of the components set forth in the following description or illustrated in the drawings. The invention is capable of other embodiments and of being practiced and carried out in various ways.

BRIEF DESCRIPTION OF THE DRAWINGS

The Detailed Description including the description of preferred systems and methods embodying features of the invention will be best understood when read in reference to the accompanying figures wherein:

FIG. 7 is an exemplary electronic log.

DETAILED DESCRIPTION OF EMBODIMENTS OF THE INVENTION

Figure 1:
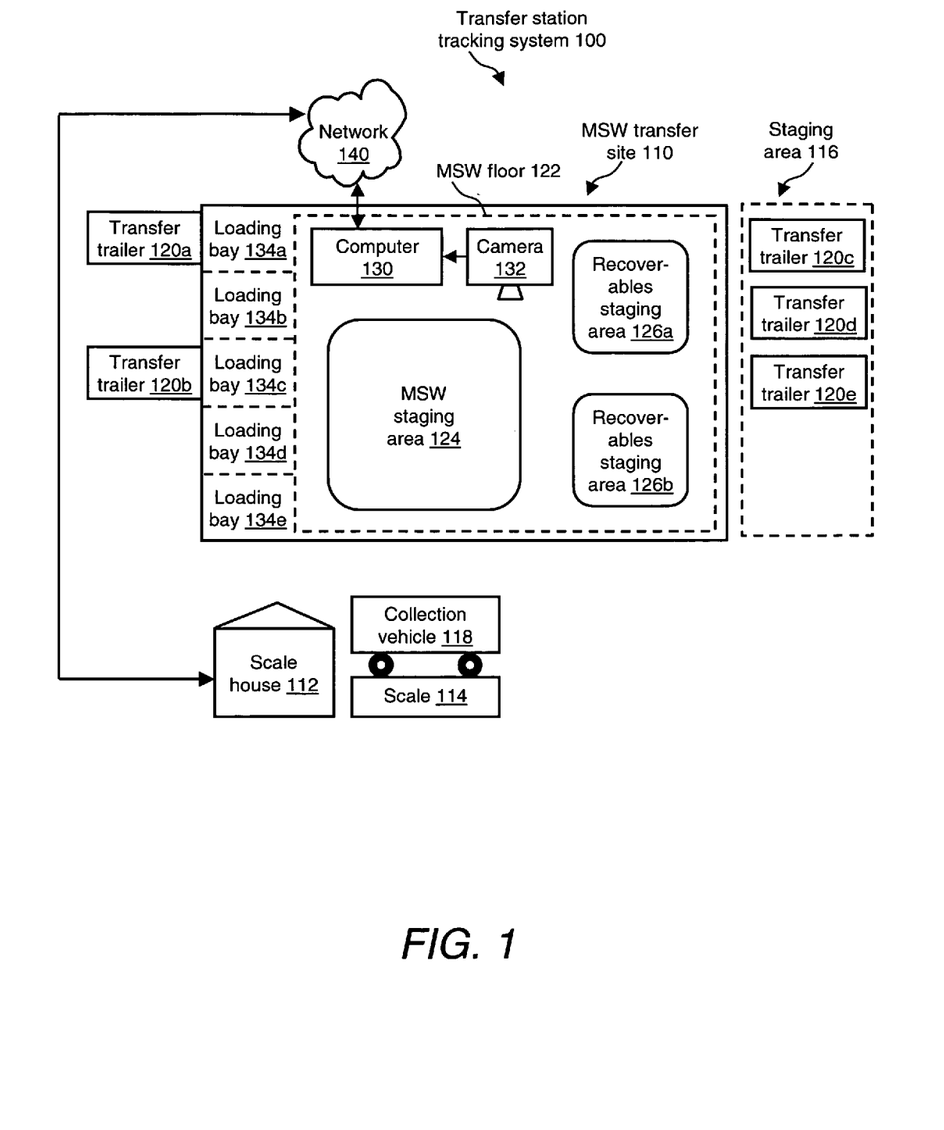
FIG. 1 is an exemplary block diagram of a transfer station tracking system in accordance with an embodiment of the present invention.

FIG. 1 is an exemplary block diagram of a transfer station tracking system 100 in accordance with an embodiment of the present invention. Transfer station tracking system 100 is generally installed within a municipal solid waste (MSW) transfer site 110. A MSW transfer site 110 includes scale house 112, staging area 116 and scale 114. Scale 114 is used to weigh collection vehicle 118, which is representative of one of several collection vehicles that arrive and depart from scale house 112.

Transfer trailers such as 120c, 120d, 120e are shown positioned within staging area 116. Transfer trailers 120a and 120b are respectively located at loading bays 134a and 134c. In general, transfer trailers 120a-e may be empty and waiting to be loaded, be already loaded and waiting to be transported to a landfill, or some combination thereof.

MSW transfer site 110 is, for example, a building or other structure within a typical MSW transfer station. MSW transfer site 110 includes MSW floor 122, which is a designated area at which collection vehicles 118 dump MSW. Staging area 124 is an area for sorting materials, such as MSW, wood, or metal. Within MSW floor 122 is recoverables staging areas 126a and 126b. Recoverables staging areas 126a, 126b, may consist, for example, of piles of metal or wood that have been separated from the MSW. Also within or associated with MSW transfer site 110 is a standard computer 130 and a camera 132. Computer 130 is general purpose standard computer, such as a desktop, or laptop, that can be connected to a computer network (not shown).

Camera 132 is a standard, video security camera, such as a Ganz D/N Hi/Res A/I 8.5-40 mm camera, that captures images of MSW floor 122 as needed. Camera can be connected to computer 130 through standard interfaces such as IEEE 1394 (FireWire) or Universal Serial Bus (USB). Multiple cameras 132 can be utilized at MSW transfer site 100.

Loading bays 134a-e are areas where, for instance, the separated materials from MSW staging area 124 and recoverables staging areas 126a, 126b are loaded onto one or more transfer trailers 120. Transfer trailers 120, once loaded, are transported to either a final disposal site (not shown) or to staging area 116, for later transport to the final disposal site. Staging area 116 is an area where empty transfer trailers 120 await transfer to loading bay 134 or where filled transfer trailers 120 await transport to a final disposal site. Empty transfer trailers 120 can then be returned back to the transfer sits 110.

Scale house 112 and scale 114 are used to weigh collection vehicles 118 or transport trailers 120. Scale house 112 is connected via network 140 to computer 130. Scale 114 is a standard industrial weight scale, such as an axle scale. Collection vehicle 118 can be any commercial, industrial or residential collection vehicle.

Figure 2:
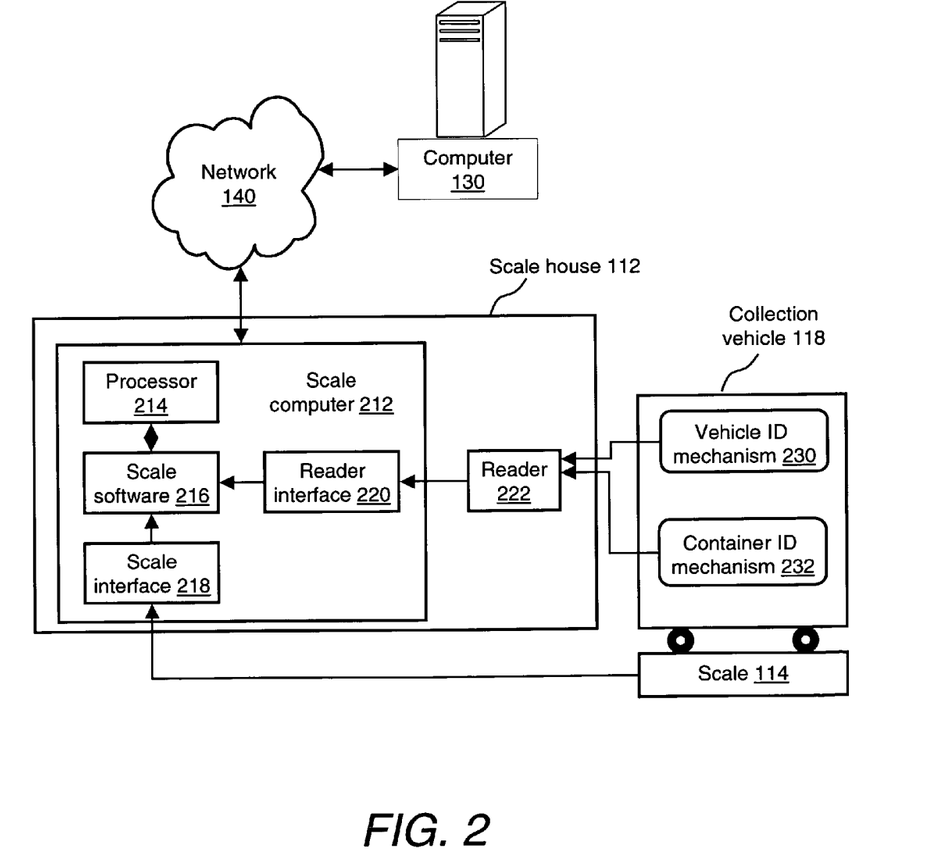
FIG. 2 is an exemplary block diagram of a networked scale house, a scale, and a collection vehicle of an embodiment of the transfer station tracking system of the present invention.

FIG. 2 is an exemplary block diagram of scale house 112, scale 114, and collection vehicle 118 of an embodiment of the transfer station tracking system 100 of the present invention. Scale house 112 includes scale computer 212, and reader 222. Reader 222 is a commercially available ID tag reader system, such as the TI-RFID radio frequency identification (RFID) system, manufactured by Texas Instruments (Dallas, Tex.).

Scale computer 212 may be a standard computer, such as a desktop or laptop, that includes a standard processor 214, scale software 216, scale interface 218, and reader interface 220. Reader interface 220 is an electronic interface, such as a universal serial bus (USB) port, or a wireless interface such as Bluetooth, that allows data (e.g., RFID data) from reader 222 to be processed in scale computer 212. Reader interface 220 interacts with scale software 216. Scale software 216 receives data from scale interface 218 and transmits the data to processor 214.

Scale software 216 is a commercially available application, such as supplied by PC Scale, Inc. (Oxford, Pa.), that facilitates transactions related to the scale-in and scale-out operations of collection vehicles 118 and transfer trailers 120. For example, scale software 216 assigns a scale ticket number to each transaction and records, for example, an associated customer ID, material weight, material quantity, and material type. Information captured via scale software 216 is transferred to computer 130 for additional processing.

Collection vehicle 118 further includes vehicle ID mechanism 230 and container ID mechanism 232. Vehicle ID mechanisms 230 are, for example, radio frequency identification (RFID) tag devices or bar codes that provide unique identification and application-specific data to reader 222. Vehicle ID mechanism 230 identifies items such as the make of vehicle 118 and/or the vehicle (118) identification number (VIN).

In operation, collection vehicle 118 pulls onto to scale 114 for processing. Scale 114 measures the weight of the truck containing MSW, and transmits the data to scale interface 218. Scale interface 218 is an electronic interface, such as a USB port, which allows data from scale 114 to be transmitted to scale software 216, processor 214, and computer 130 via network 140. In this manner, collection vehicle 118 is weighted prior to depositing its MSW contents onto floor 122, and is again weighed after depositing its contents onto floor 122. The difference in weight equals the weight of MSW contents deposited onto floor 122, as is shown and discussed, for example, in connection with FIG. 7.

Figure 3:
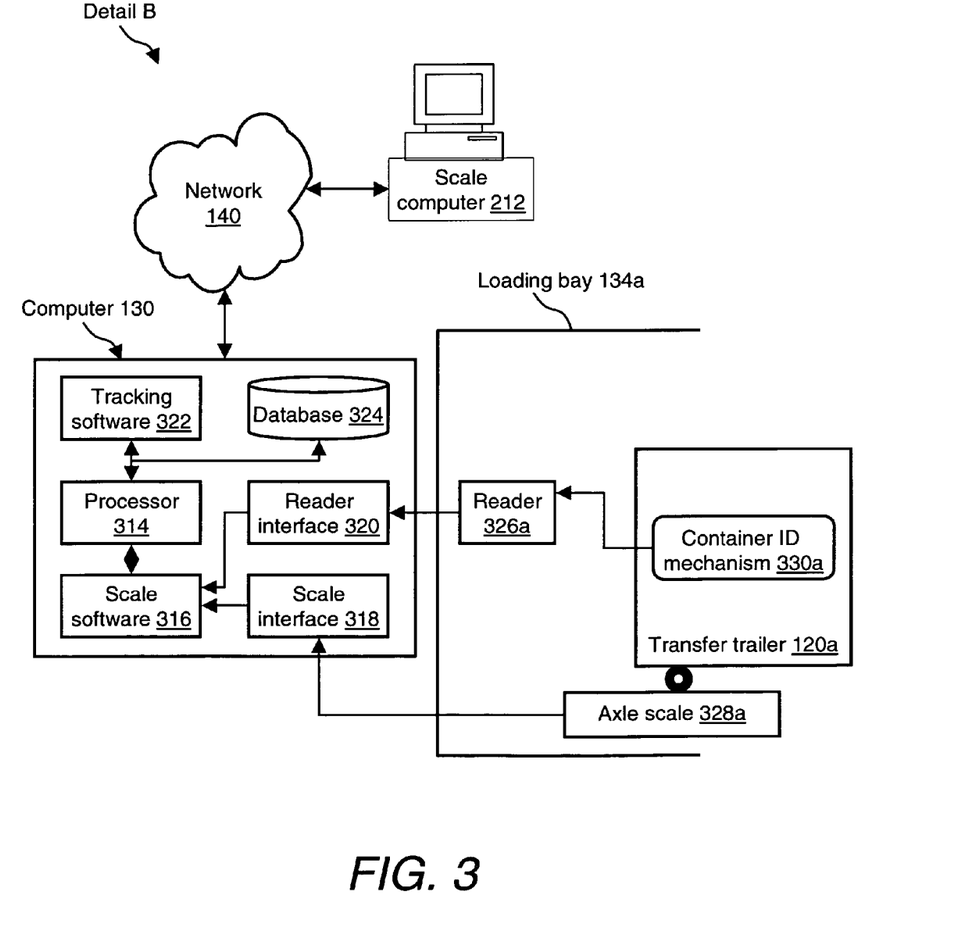
FIG. 3 is an exemplary block diagram of a networked transfer trailer, computer, and loading bay of an embodiment of the transfer station tracking system of the present invention.

FIG. 3 is an exemplary block diagram of a networked transfer trailer 120a, computer 130, and loading bay 134a of transfer station tracking system 100. Computer 130 further includes processor 314, scale software 316, scale interface 318, and reader interface 320. Additionally, computer 130 executes tracking software 322 which is linked to database 324. Reader interface 320 is an electronic interface, such as a USB port, that allows data (e.g., data stored in a RFID tag) from reader 326a to be processed by computer 130.

Reader interface 320 allows data to be transmitted to scale software 316. Scale software 316 receives data from scale interface 318 and transmits the data to processor 314. Tracking software 322 processes data that is captured via scale software 216 (FIG. 2) and scale software 316 during each scale-in or scale-out operation, for storage in database 324. Software 322 calculates the net tonnage of waste present at MSW floor 122 at any given time. For example, software 322 keeps a running total of inbound tonnage that is deposited via collection vehicles 118 at MSW floor 122 and also keeps a running total of outbound tonnage that is transported via transfer trailers 120 out of MSW floor 122.

In order to determine the net tonnage of material present on MSW floor 122 at any given time, a comparison of the running totals of inbound tonnage vs. outbound tonnage is performed by software 322. Examples of the tracking operations of software 322 are described in connection with FIGS. 5 and 6. Additionally, software 322 can track the status of transfer trailers 120 at any given time, as described in connection with FIG. 7.

Database 324 is standard database, which contains a collection of data that is related to collection vehicles 118 and transfer trailers 120. Database 324 resides in a memory device, such as a hard disk drive (not shown), of computer 130.

Located within loading bay 134a is one or more readers 326a and scale 328a. Transfer trailer 120a further includes one or more container ID mechanisms 330a that uniquely identify transfer trailer 120a. ID mechanisms 330a can be, for example, RFID tags or bar codes that provide application-specific data to reader 326a.

Reader 326a is a commercially available ID tag reader system, such as the TI RFID system, manufactured by Texas Instruments (Dallas, Tex.). Axle scale 328a is an industrial weight axle scale that weighs a transfer trailer 120. Axle scale 328a transmits data to scale software 316 via scale interface 318. Scale interface 318 is an electronic interface, such as a USB port, which allows data from axle scale 328a to be transmitted to scale software 316.

With continuing reference to FIGS. 1-3, the operation of transfer station tracking system 100 to track the flow of collection vehicles 118 and transfer trailers 120, and the associated tonnage of waste therein, is as follows.

Collection vehicles 118 containing MSW weigh in at scale house 112, deposit their MSW on floor 122, and weigh out at scale house 112 prior to leaving system 100. The difference between the entering weight and the exiting weight of collection vehicle 118 provides the weight of deposited MSW.

With regard to each individual collection vehicle 118, ID mechanisms, such as vehicle ID mechanism 230 and container ID mechanism 232, can be scanned by reader 222 when collection vehicle 118 is proximate reader 222. Such scanning can be automated or manual. ID data is transmitted to scale software 216 via reader interface 220. Additionally, the weight of any given collection vehicle 118 is determined by scale 114 and transmitted to scale software 216 via scale interface 218. Subsequently, data is captured by scale software 216 and transmitted to computer 130, for processing via network 140 and storage within database 324. ID data may also be stored locally in a database (not shown) on scale computer 212.

Empty transfer trailers 120 within the transfer site 110 are transported to loading bay 134 for loading. Once filled, and just prior to being transported away from site 110 to a final disposal site, transfer trailers 120 undergo a scale-out operation at scale house 112, and a scale-in operation when they return, in order to determine the tonnage of material that has been disposed of. Empty transfer trailers 120 are returned to the transfer site 110 for reuse. With regard to each individual transfer trailer 120, such as transfer trailer 120a, ID mechanisms such as container ID mechanism 330a, are scanned by reader 326a when transfer trailer 120 is proximate reader 326a. The scanned ID data is transmitted to scale software 316 via reader interface 320. Additionally, the weight of transfer trailer 120a is determined by axle scale 328a and transmitted to scale software 316 using scale interface 318. Subsequently, data is captured automatically by scale software 316 and stored within database 324, for processing by software 322. Alternatively, the weight of transfer trailer 120a can be determined at scale house 112 via scale 114.

Software 322 processes the data that is stored within database 324, by tracking the total tonnage of waste dumped at MSW floor 122 by collection vehicles 118 and by tracking the total tonnage of waste removed from MSW floor 122 by transfer trailers 120. In doing so, software 322 is able to calculate the net tonnage of waste that is present at MSW floor 122 at any given time, which is useful, for example, in determining when a clean floor event has occurred. Examples of specific uses of software 322 are found in more detail in reference to the methods of FIGS. 4, 5, and 6.

Figure 4:
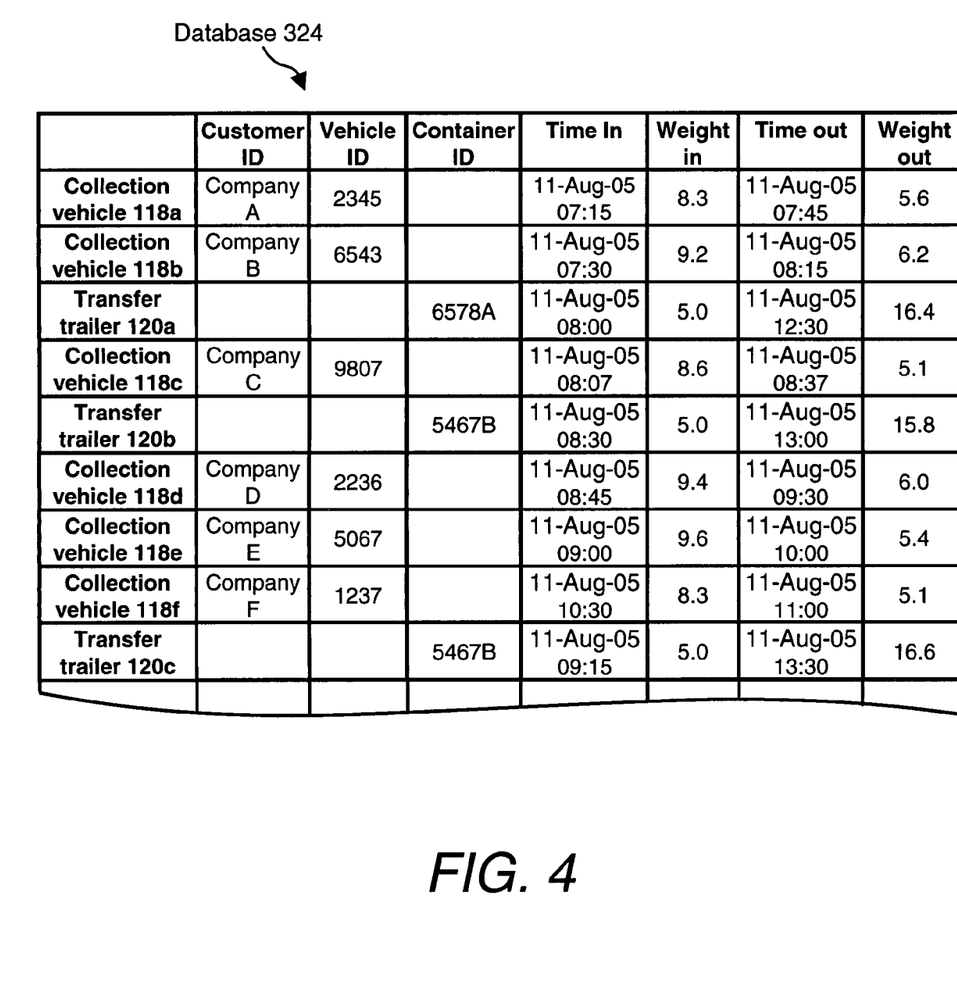
FIG. 4 is an exemplary database of the transfer station tracking system.

FIG. 4 is an exemplary database 324 that can be used with system 100. Database 324 includes, for example, data that reflects activity and information related or pertaining to collection vehicles 118a-f, and transfer trailers 120a-c. Exemplary data related to collection vehicles 118 and transfer trailers 120 can include a CUSTOMER ID, a VEHICLE ID, a CONTAINER ID, a TIME IN, a WEIGHT IN (e.g., in tons), a TIME OUT, and a WEIGHT OUT (e.g., in tons).

Figure 5:
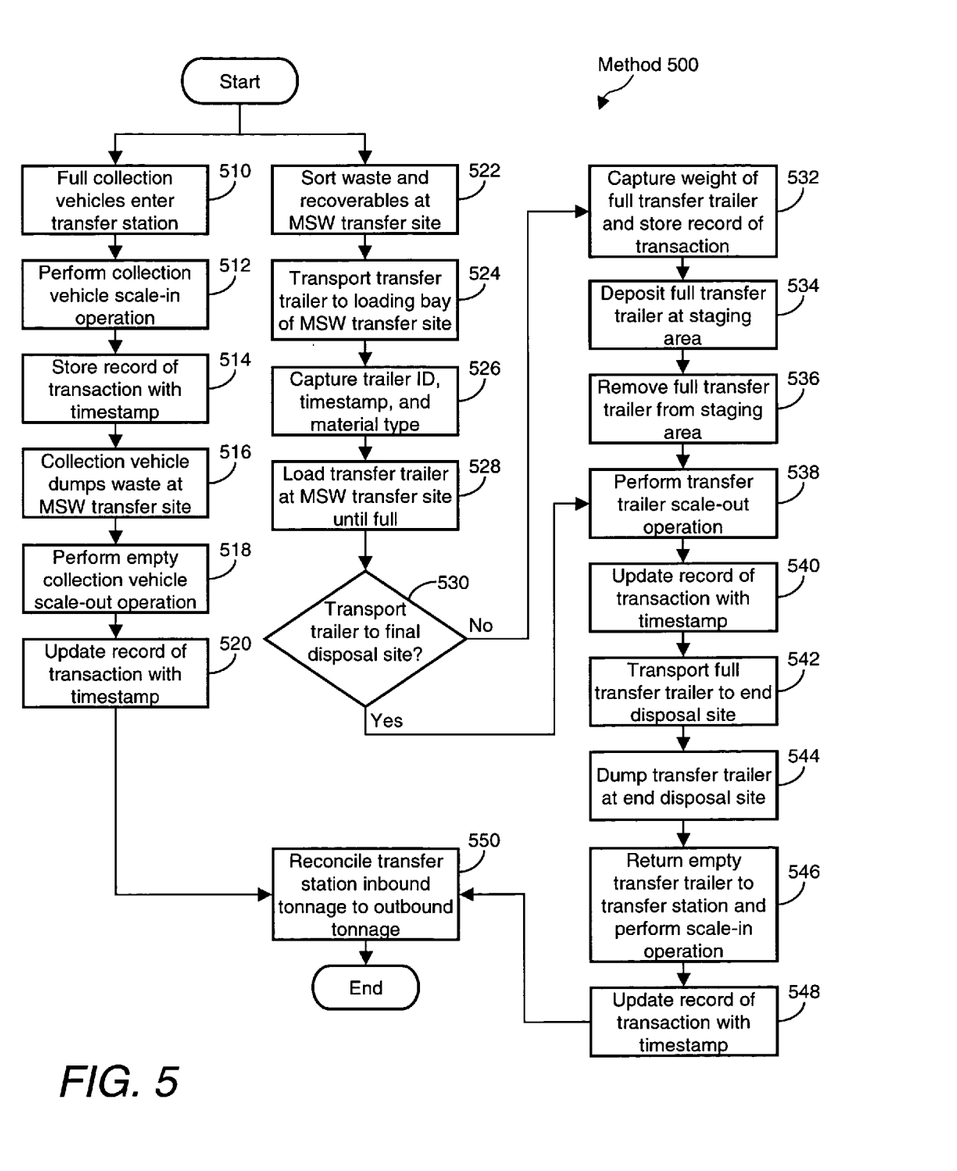
FIG. 5 is a flow diagram of an exemplary method of using an embodiment of the transfer station tracking system.

FIG. 5 illustrates a flow diagram of an exemplary method 500 of using transfer station tracking system 100. Method 500 illustrates the sequence of events that collection vehicles 118 and transfer trailers 120 experience when they utilize and/or operate in accordance with system 100.

Steps 510 through 520 and steps 522 through 548 can execute concurrently or sequentially. In addition, multiple streams of each process can be executed at the same time. The use of timestamps allows tracking software 322 to record and process multiple incoming trucks multiple outgoing transfer trailers at the same time.

At step 510, a collection vehicle 118, such as a collection vehicle 118a, which is filled with MSW or recyclables pulls up to scale house 112. At step 512, collection vehicle 118a pulls onto and is weighed by scale 114. The resulting scale data that indicates the "full" weight of collection vehicle 118a is transmitted via scale interface 218 to scale software 216. At substantially the same time, vehicle ID mechanism 230 and container ID mechanism 232 are scanned by reader 222. Scanning can be performed manually, or in an automated manner. This data is transmitted via reader interface 220 to scale software 216.

At step 514, data that is captured at step 512 is transmitted from scale computer 212 to computer 130 via network 140, and stored in database 324. In particular, the weight of collection vehicle 118a and associated ID data is timestamped (i.e., includes current date and time) and stored in database 324.

At step 516, collection vehicle 118a deposits the waste (MSW) on MSW floor 122. At step 518, collection vehicle 118a, which is now emptied of MSW or recyclables, again pulls onto and is weighed by scale 114. The resulting scale data, representative of the empty weight of collection vehicle 118a, is transmitted to scale computer 212.

Alternatively, the empty weight of each collection vehicle 118, such as collection vehicle 118a, may already be known and stored within computer 130 and/or scale computer 212. In this case, the scale-out operation of step 518 may be omitted, or used as a verification step to verify that collection vehicle 118a is empty. Scale software 216 performs a calculation, to determine the difference between the "full" weight (captured at step 512) and the empty weight of collection vehicle 118a. In doing so, the weight of the MSW material that was left on MSW floor 122 at step 516 is determined.

At step 520, data collected in step 518 that is associated with collection vehicle 118a is transferred from scale computer 212 to computer 130 via network 140, and the record of this transaction, which includes a timestamp, is stored in database 324. Method steps 510 though 520 are exercised for any number of collection vehicles 118 that experience a scale-in and scale-out operation within system 100. Furthermore, steps 510 though 520 can execute concurrently with steps 522 though 548.

At step 522, MSW that is deposited at step 516 is sorted into piles, such as an MSW only pile, which can be placed at MSW staging area 124, and recoverables only (e.g., wood or metal), which can be placed at recoverables staging areas 126.

At step 524, a transfer trailer 120 such as transfer trailer 120a, which is empty and ready for loading, is transported to an unoccupied loading bay 134 such as loading bay 134a. At step 526, when transfer trailer 120a is transported to loading bay 134a, the information stored in its associated ID mechanism 330a, along with a timestamp, is captured. For example, for transfer trailer 120a at loading bay 134a, container ID mechanism 330a is scanned by reader 326a, when transfer trailer 120a is proximate reader 326a. Scanning can be manual or automatic. Subsequently, reader 326a transmits the data to computer 130 via reader interface 320, and the data is stored in database 324. At step 528, transfer trailer 120a is loaded, preferably until substantially full with material from MSW staging area 124 or recoverables staging areas 126.

At decision step 530, if transfer trailer 120a, which is full, is not ready to be transported to a final disposal site, method 500 proceeds to step 532. However, if transfer trailer 120a, which is full, is able to be transported to a final disposal site, method 500 proceeds to step 538.

At step 532, transfer trailer 120a is weighed on axle scale 328a, and the resulting scale data that indicates the "full" weight of transfer trailer 120a is transmitted via scale interface 318 to computer 130, wherein a record of this transaction, which includes a timestamp, is stored in database 324. Alternatively, in the event that system 100 does not include an additional scale 324, such as an axle scale, transfer trailer 120a is transported to scale house 112 and weighed on scale 114. The resulting scale data that indicates the "full" weight of transfer trailer 120a is transmitted via scale interface 218 to scale computer 212, and then transmitted via network 140 to computer 130, wherein a record of this transaction, which includes a timestamp, is stored in database 324. More specifically, and in either case, the weight and ID data of transfer trailer 120a is timestamped and stored in database 324.

At step 534, transfer trailer 120a, which is filled with material from MSW staging area 124 or recoverables staging areas 126, is transported from loading bay 134a and deposited at staging area 116. At step 536, when a transport vehicle (not shown) is available, full transfer trailer 120a is transported away from staging area 116 to a final disposal site.

At step 538, transfer trailer 120a pulls onto scale 114, and a scale-out operation is performed. More specifically, transfer trailer 120a is weighed on scale 114, and the resulting scale data that indicates the "full" weight of transfer trailer 120a is transmitted to scale computer 212 and stored in database 324. At substantially the same time, ID mechanism 330a can be read by reader 222. This ID mechanism uniquely identifies transfer trailer 120a. ID data is transmitted via reader interface 220 to scale computer 212. Subsequently, transfer trailer 120a, which is filled with material from MSW staging area 124 or recoverables staging areas 126, exits the transfer site 110.

At step 540, data collected at step 532 or step 538 that is associated with transfer trailer 120a is transmitted from scale computer 212 to computer 130 via network 140, and the record of this transaction, which includes a timestamp, is updated and stored in database 324. At step 542, transfer trailer 120a is transported away from the transfer site 110 to its final disposal site. At step 544, transfer trailer 120a arrives at the final disposal site and the materials therein are emptied.

At step 546, transfer trailer 120a, which has been emptied, is transported back to the transfer site 110, and a scale-in operation is performed using scale 114. More specifically, emptied transfer trailer 120a is weighed on scale 114, and the resulting scale data that indicates the empty weight of transfer trailer 120a is transmitted to scale computer 212. At substantially the same time, ID mechanisms, such as container ID mechanism 330a, can be scanned by reader 222.

Alternatively, if the weight of a particular transfer trailer 120a is known in advance, the known weight can be used to determine the weight of material within the transfer trailer. Knowing the weight of a particular transfer trailer 120a in advance makes it unnecessary for such transfer trailers to be weighed after their contents are emptied. For example, suppose it is known that a transfer trailer 120a weighs 1.0 tons, and the transfer trailer 120a weights 6.2 tons when initially weighted. From this it can be assumed that transfer trailer 120a contains 5.2 tons of MSW (6.2-1.0), which will be deposited on MSW floor 122.

At step 548, data collected at step 546 that is associated with transfer trailer 120a is transmitted from scale computer 212 to computer 130 via network 140, and the record of this transaction, which includes a timestamp, is stored in database 324. Steps 522 though 548 can be performed for any number of transfer trailers 120.

At step 550, the transfer site 110 inbound tonnage and outbound tonnage is reconciled preferably, but optionally, on a continuous basis. More specifically, software 322 can use data stored in database 324 to maintain a running total of MSW waste tonnage deposited by collection vehicles 118 on MSW floor 122, such as captured in step 520, and waste tonnage departing MSW floor 122 of MSW transfer site 110 in all transfer trailers 120, such as captured in step 548.

On a preferably regular basis, software 322 queries database 324, analyzes timestamps, and subtracts the tonnage of waste that is removed via multiple transfer trailers 120 from MSW floor 122 from the tonnage of waste that is dumped via multiple collection vehicles 118 at MSW floor 122. In other embodiments, reconciliation can be triggered by predetermined events. For example, a reconciliation can be performed at a collection vehicle scale-out operation, or a transfer trailer 120 scale-in operation. In doing so, software 322 provides a running calculation of the net tonnage of waste that is present at MSW floor 122, for reporting the status of MSW floor 122 at any given time.

Figure 6:
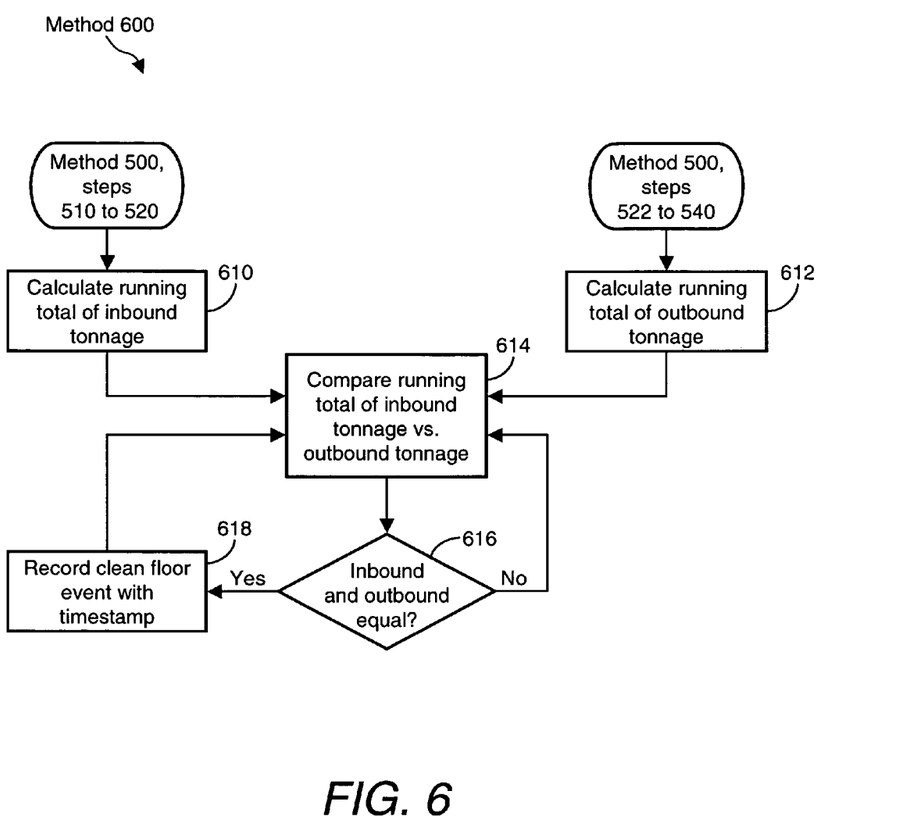
FIG. 6 is an exemplary flow diagram of a method of tracking clean floor events, by use of the transfer station tracking system.

Additionally, a digital image of MSW floor 122 is captured periodically, timestamped by camera 132, and stored in a memory device, such as a hard disk drive (not shown), of computer 130. As a result of method 500, specific information to confirm compliance with clean floor regulations can be accessed and demonstrated at any time, which is illustrated in method 600 below.

Software 322 can also be used to track the amount of time that a transfer trailer 120a can remain at a transfer site 110. For example, a scale-in and scale-out timestamps can be used to determine the time that collection vehicles 118 and transfer trailers 120 are at transfer site 110, as shown in FIG. 4.

More particularly, and referring again to FIG. 5, a transfer trailer is transported to loading bay 134 at step 524. At step 526, the ID information of the transfer trailer 120 and a time stamp is transmitted to computer 130 and stored in database 324. Transfer trailer 120 is then loaded with MSW at step 528 to be transported to a final disposal site. If a transport vehicle is ready to transport the transfer trailer 120, the transport vehicle proceeds to the scale-out operation at step 538, and the transfer trailer ID along with the timestamp of the operation is recorded and transmitted to computer 130. Software 322 then calculates the time difference between the timestamps recorded at step 526 and step 538, representing when loading began and when the scale out operation was performed, respectively. This time difference is stored in database 324 along with the transfer trailer ID and both timestamps.

If a transport vehicle is not available, the process for calculating the time at the transfer station is similar. One difference is that the transfer trailer 120 is temporarily moved to the staging area 118 as shown at step 532, and remains there until a transport vehicle becomes available.

When a transport vehicle does become available, a scale-out operation is performed as shown at step 538, and transfer trailer 120 is transported away to a final disposal site. Weight and timestamp information is transmitted to database 324, and software 322 performs the same steps for calculating and storing the time difference as described above in connection with steps 526-540.

The empty weight of transfer trailer 120 may also be determined by weighing before transfer trailer 120 is filled, or after transfer trailer 120 is emptied. The filled weight may be measured shortly after filling, and before entering staging area 116, or shortly prior to transfer trailer 120 exiting system 100.

FIG. 6 illustrates an exemplary flow diagram of a method 600 of tracking clean floor events. At step 610, the system 100 inbound tonnage is calculated, using data captured at step 520. More specifically, tracking software 322, in combination with database 324 maintains a running total of all waste tonnage that is deposited via multiple collection vehicles 118 at MSW floor 122.

At step 612, the system 100 outbound tonnage is calculated by using data that is captured at step 540. More specifically, tracking software 322, in combination with database 324, maintains a running total of waste tonnage departing MSW floor 122, in multiple transfer trailers 120.

At step 614, transfer site 110 inbound tonnage and outbound tonnage is reconciled. Preferably on a regular basis, tracking software 322 queries database 324, analyzes timestamps, and subtracts the tonnage of waste that is removed via multiple transfer trailers 120 from MSW floor 122 from the tonnage of waste that is dumped via multiple collection vehicles 118. In doing so, software 322 provides a running calculation of the net tonnage of waste that is present at MSW floor 122, which can be used to report the status of MSW floor 122 at any given time.

At decision step 616, based upon the calculations of step 614, if it is determined that the inbound tonnage and outbound tonnage are equivalent, method 600 proceeds to step 618. Alternatively, based upon the calculations of step 614, if it is determined that the inbound tonnage and outbound tonnage are not equivalent, method 600 returns to step 614.

At step 618, a clean floor event is recorded. More specifically, this event is recorded, time stamped, and stored in database 324. Additionally, a digital image of MSW floor 122 can be captured and timestamped by camera 132 and stored in a memory device, such as a hard disk drive (not shown), of computer 130. The timestamp allows the captured image to be correlated with the clean floor event stored in the database and retrieved if necessary to demonstrate compliance with regulations. Alternatively, the captured image can be stored in database 322 along with the recorded clear floor event and timestamp, using a database system with the capability to store binary objects, such as Microsoft SQL server. As a result, a report of all transactions that lead up to and achieve the clean floor event, along with the associated digital image that is taken at the moment of occurrence, is available upon request. At the completion of step 618, the method returns to step 614.

An example log that results from the calculations of steps 614, 616, and 618 is shown in FIG. 7. FIG. 7 is an exemplary electronic log 700 that is generated on a given date (not shown) by software 322. Data stored in database 324 is used by software 322 to perform calculations. More specifically, table 700 shows transactions, in chronological order, related to collection vehicles 118 and transfer trailers 120.

In this example, table 700 shows LINEs 1 to 26, each of which represents a transaction. For each transaction, SCALE IN data and/or SCALE OUT data is logged, as well as the resulting TRANSACTION NET WEIGHT for either a given collection vehicle 118 or a given transfer trailer 120. Accordingly, a running total of TOTAL NET WEIGHT IN, TOTAL NET WEIGHT OUT, and OVERALL NET WEIGHT is calculated (e.g., in tons) and logged by use of tracking software 322 of transfer station tracking system 100.

In this example, it is assumed that LINE 1 of Table 700 is the first transaction immediately following a clean floor event, which is defined as an OVERALL NET WEIGHT equal to zero tons on MSW floor 122. Table 700 shows a running calculation, in chronological order, of the OVERALL NET WEIGHT, which is the TOTAL NET WEIGHT OUT (in tons) subtracted from the TOTAL NET WEIGHT IN (in tons). LINE 26 of table 700 shows an OVERALL NET WEIGHT equal to zero and, thus, LINE 26 indicates that a clean floor event occurs at 13:30 on the given date. As a result, a report of all transactions that lead up to and achieve the clean floor event, along with the associated digital image that is taken at the moment of occurrence (i.e., 13:30 in this example), is available upon request.

We claim:

1. A system for monitoring waste at a waste transfer station that includes a scale area and a municipal solid waste (MSW) floor, comprising:
   a reader for reading at a scale area:
   i) a first plurality of identifiers, each of the first plurality of identifiers storing a vehicle identifier associated with a respective plurality of waste collection vehicles;
   ii) a second plurality of identifiers, each of the second plurality of identifiers storing a waste receptacle identifier associated with a respective plurality of waste receptacles;
   a second reader for reading at the MSW floor:
   at least one of the second plurality of identifiers associated with one of a plurality of waste receptacles,
   a general purpose computer comprising a scale interface utilizing a data repository that stores:
   iii) the read vehicle identifier associated with respective waste collection vehicles;
   iv) the read waste receptacle identifier associated with respective waste receptacles;
   v) a first plurality of values representing a weight difference, between a respective plurality of non-empty and substantially empty waste collection vehicles, at respective times within the waste transfer station, wherein the first plurality of values respectively correspond to a weight of material deposited within the MSW floor; and
   vi) a second plurality of values representing a weight difference, between a respective plurality of substantially non-empty and substantially empty waste receptacles, at respective times within the waste transfer station, wherein the second plurality of values correspond to a weight of material removed from the MSW floor,
   vii) the computer maintaining a running total by utilizing the weight differences at the respective times, in a time sequenced manner, to add each of the first plurality of values and subtract each of the second plurality of values from the first plurality of values, wherein the running total is calculated in real time; and further wherein a running total value of zero indicates that no material is within the MSW floor; and
   at least one camera and video recording device configured to capture at least one image of the MSW floor when the running total value is equal to zero.

2. The system of claim 1, wherein the at least one image is used to confirm that there is no or substantially no material within the MSW floor when the running total value is equal to zero.

3. The system of claim 1, further comprising a scale located within the scale area and electronically configured to transmit the first plurality of values and the second plurality of values to the data repository.

4. The system of claim 3, wherein the first plurality of values are transmitted from the scale to the data repository using at least one network.

5. The system of claim 3, wherein the second plurality of values are transmitted from the scale to the data repository using at least one network.

6. The system of claim 1, wherein the first plurality of identifiers comprise at least one of a radio frequency identifier (RFID) tag and a bar code.

7. The system of claim 1, wherein the second plurality of identifiers comprise at least one of a radio frequency identifier (RFID) tag and a bar code.

8. The system of claim 1, wherein the general purpose computer utilizes at least one read vehicle identifier associated with the respective waste collection vehicles to track the location of at least one waste collection vehicle.

9. The system of claim 1, wherein the scale interface allows data from a scale to be transmitted to the general purpose computer.

10. The system of claim 1, wherein the general purpose computer generates an instruction to reuse the respective waste receptacles determined to be substantially empty.

11. The system of claim 1, wherein the general purpose computer generates a record of each transaction determining at least one of the first plurality of values and second plurality of values.

12. The system of claim 1, further comprising a scale located within the MSW floor and electronically configured to transmit the second plurality of values to the data repository.

13. The system of claim 12, wherein the second plurality of values are transmitted from the scale to the data repository using at least one network.

14. The system of claim 12, wherein the at least one scale is an axle scale.

15. The system of claim 1, wherein the system is adapted to track the interchange of the plurality of waste receptacles with an individual vehicle.

16. A computer program product residing on a computer readable medium for monitoring a waste at a waste transfer station that includes a scale area and a municipal solid waste (MSW) floor, the computer program product comprising instructions for causing a computer to:
   store a plurality of vehicle identifiers associated with a respective plurality of collection vehicles, wherein the vehicle identifiers are read at the scale area;
   store a plurality of waste receptacle identifiers associated with a respective plurality of waste receptacles, wherein the waste receptacle identifiers are in at least one of the scale area or the MSW floor;
   determine a first plurality of values, at respective times within a MSW floor, representing a weight difference between a respective plurality of non-empty and substantially empty collection vehicles, wherein the first plurality of values respectively correspond to a weight of material deposited within the MSW floor;
   determine a second plurality of values, at respective times within the MSW floor, representing a weight difference between a respective plurality of non-empty and substantially empty waste receptacles, wherein the second plurality of values respectively correspond to a weight of material removed from the MSW floor;
   utilize the respective times in a time sequenced manner to determine a running total by adding each of the first plurality of values and subtracting each of the second plurality of values from the first plurality of values, wherein a running value of zero indicates that no material is within the MSW floor; and
   store at least one image of the MSW floor when the running total value is equal to zero.

17. The computer program product 16, wherein the at least one image is used to confirm that there is no or substantially no material within the MSW floor when the running total value is equal to zero.

18. The computer program product of claim 16, wherein the plurality of vehicle identifiers are read by a reading device prior to being stored.

19. The computer program product of claim 16, wherein the plurality of waste receptacle identifiers are read by a reading device prior to being stored.

20. The computer program product of claim 16, further comprising instructions to track the interchange of the plurality of waste receptacles with an individual vehicle.

21. A computer-implemented method for determining a quantity of waste within a waste transfer station that includes a municipal solid waste floor (MSW) floor, comprising:
- a) storing at a first time a first collection vehicle weight and a collection vehicle identifier in a data repository;
- b) depositing a waste content of the collection vehicle within the MSW floor;
- c) storing in the data repository at a second time a difference between the first collection vehicle weight and a second collection vehicle weight determined subsequent to step b);
- d) storing at a third time a first waste receptacle weight and a waste receptacle identifier in the data repository;
- e) depositing waste content within the municipal solid waste floor into the waste receptacle;
- f) storing in the data repository at a fourth time a difference between a second waste receptacle weight determined subsequent to step e) and the first waste receptacle weight;
- g) repeating steps a)-c) and steps d)-f) until a time-sequenced running total of the weight difference in step c) minus the weight difference in step f) is equal to zero; and
- h) recording and storing at least one image of the MSW floor when the running total of the weight difference in step c) minus the weight difference in step f) is equal to zero.

22. The computer-implemented method of claim 21 wherein the difference between the first collection vehicle weight and the second collection vehicle weight is electronically transmitted to the data repository.

23. The computer-implemented method of claim 21 wherein the difference between the second waste receptacle weight and the first waste receptacle weight is electronically transmitted to the data repository.

24. The computer-implemented method of claim 21, wherein the at least one image is used to confirm that there is no or substantially no material within the MSW floor when the weight difference in step c) minus the weight difference in step f) is equal to zero.

25. The computer-implemented method of claim 21, further comprising using a difference between the fourth time and the third time to determine a length of time that waste receptacle has been in the vicinity of the MSW floor.

26. The computer-implemented method of claim 21, further comprising tracking the interchange of a plurality of waste receptacles with a particular vehicle.

* * * * *